US008727856B2

(12) United States Patent
Kup-Ferroth

(10) Patent No.: US 8,727,856 B2
(45) Date of Patent: May 20, 2014

(54) GAMING SYSTEM, GAME CONTROLLER AND METHOD OF GAMING

(75) Inventor: Peter Thomas Kup-Ferroth, Lane Cove NSW (AU)

(73) Assignee: Aristocrat Technologies Australia Pty Limited (AU)

( * ) Notice: Subject to any disclaimer, the term of this patent is extended or adjusted under 35 U.S.C. 154(b) by 707 days.

(21) Appl. No.: 12/720,145

(22) Filed: Mar. 9, 2010

(65) Prior Publication Data

US 2010/0234085 A1 Sep. 16, 2010

(30) Foreign Application Priority Data

Mar. 11, 2009 (AU) ................................ 2009901042

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/16; 463/13; 463/20; 463/25; 463/40; 463/42

(58) Field of Classification Search
USPC .............................. 463/13, 16, 20, 25, 40, 42
See application file for complete search history.

(56) References Cited

U.S. PATENT DOCUMENTS

| | | | | |
|---|---|---|---|---|
| 2003/0027625 | A1 * | 2/2003 | Rowe | 463/20 |
| 2006/0046823 | A1 * | 3/2006 | Kaminkow et al. | 463/16 |
| 2009/0061974 | A1 * | 3/2009 | Lutnick et al. | 463/13 |
| 2010/0120503 | A1 * | 5/2010 | Hoffman et al. | 463/20 |
| 2010/0323781 | A1 * | 12/2010 | Acres | 463/20 |

* cited by examiner

*Primary Examiner* — Adetokunbo O Torimiro
(74) *Attorney, Agent, or Firm* — McAndrews, Held & Malloy, Ltd.

(57) ABSTRACT

A method of gaming comprising the step of triggering an event to occur on one or more gaming devices in response to the occurrence of a designated, outcome of an independent table game.

42 Claims, 8 Drawing Sheets

GAMING SYSTEM, GAME CONTROLLER AND METHOD OF GAMING

RELATED APPLICATIONS

This application claims priority to Australian Provisional Patent Application No. 2009901042, having a filing date of Mar. 11, 2009, which is hereby incorporated by reference herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of gaming, a gaming system and a game controller.

It is known to provide a gaming system including a game controller arranged to generate a random result and apply game rules to the result to determine a game outcome for which a player may be awarded a prize if a predetermined winning outcome occurs.

BRIEF SUMMARY OF THE INVENTION

According to one aspect, there is provided a method of gaming comprising the step of triggering an event to occur on one or more gaming devices in response to the occurrence of a designated, outcome of an independent table game.

According to another aspect, there is provided a game controller comprising a trigger monitor adapted to receive trigger information in response to the occurrence of a designated, outcome of an independent table game, and in response to the trigger information, trigger an event to occur on at least one gaming device controlled by the game controller.

According to another aspect, there is provided a gaming system comprising an independent table game adapted to generate game outcomes for a table game, and one or more game controllers each controlling one or more gaming devices and having a trigger monitor adapted to receive trigger information in response to the occurrence of a designated table game outcome and trigger an event to occur on at least one of the controlled gaming devices.

The game controllers and table game can be in data communication via a gaming network.

An award manager adapted to determine an award for one or more players of the gaming devices in response to the triggered event can also be provided.

The event can be determining an award for one or more players of the gaming devices.

The award can be allocated from an award pool associated with the gaming devices.

In some embodiments the award is allocated from an award pool dedicated for the triggered event. The dedicated award pool can be exclusive to a gaming device for the award.

In alternative embodiments the award can be allocated from one or more prize pools for regular game outcomes.

The award pools can be exclusive to a gaming device for the award.

A gaming device can be selectively associated with the independent table game for triggering the event in response to the table game outcome. For example, associating the gaming device with an independent table game can be controlled by a gaming venue administrator.

Alternatively, associating the gaming device with an independent table game can be performed in response to fulfilling eligibility criteria for the gaming device. For example, the eligibility criteria can be a player opting in to the event triggering. The player opting in can include payment of an additional bet by the player.

Alternatively, the eligibility criteria can be a based on an outcome of a regular gaming device game.

Alternatively, the eligibility criteria can be a based on a threshold credit value for the gaming device.

According to another aspect, there is provided computer program code which when executed causes a computer to implement a computer controlled gaming method as described above.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
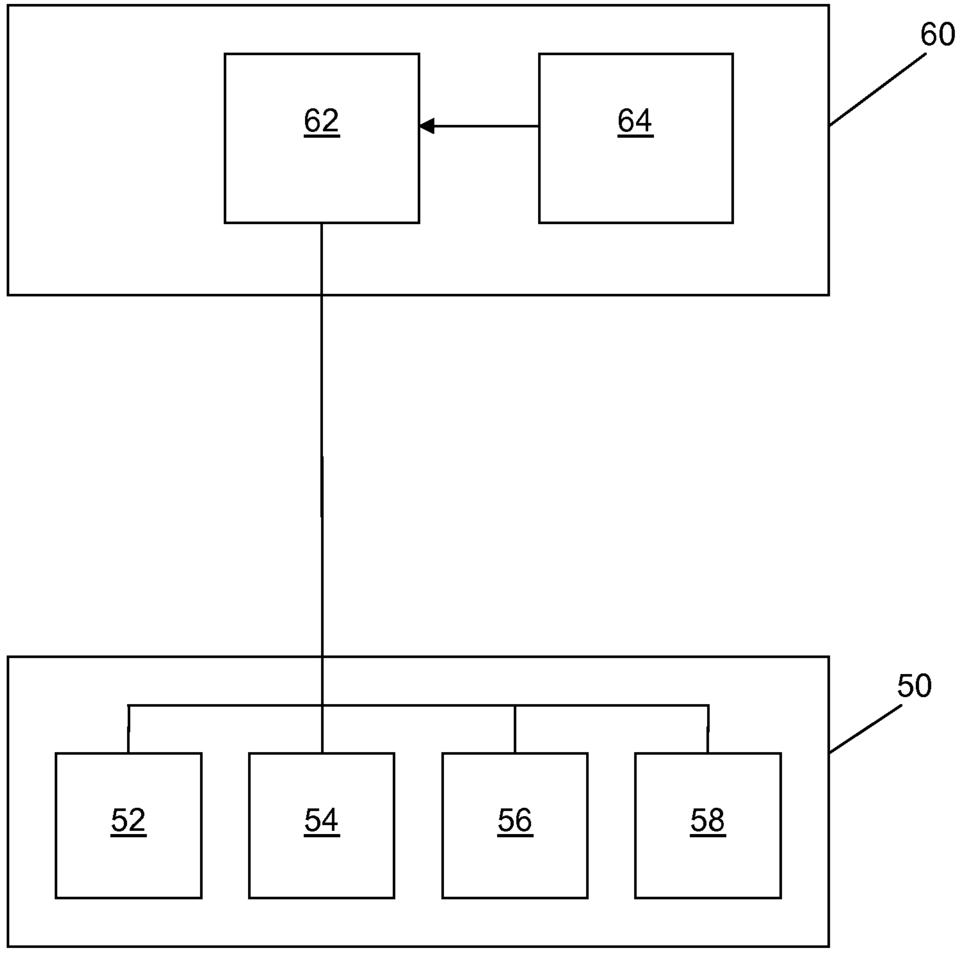
FIG. 1 is a block diagram of the core components of a gaming system.

Referring to the drawings, there is shown a gaming system having a game controller arranged to implement a game wherein an outcome occurring in an independent table game can trigger an event on one or more gaming devices. For example, one or more prizes can be awarded to players of the gaming devices in response to the triggered event.

General Construction of Gaming System

Gaming devices or gaming systems capable of participating in the method of gaming of the embodiment can take any suitable form including stand alone gaming machines and server based gaming terminals.

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming terminal and some of the components required for implementing the game are located remotely relative to the gaming terminal. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
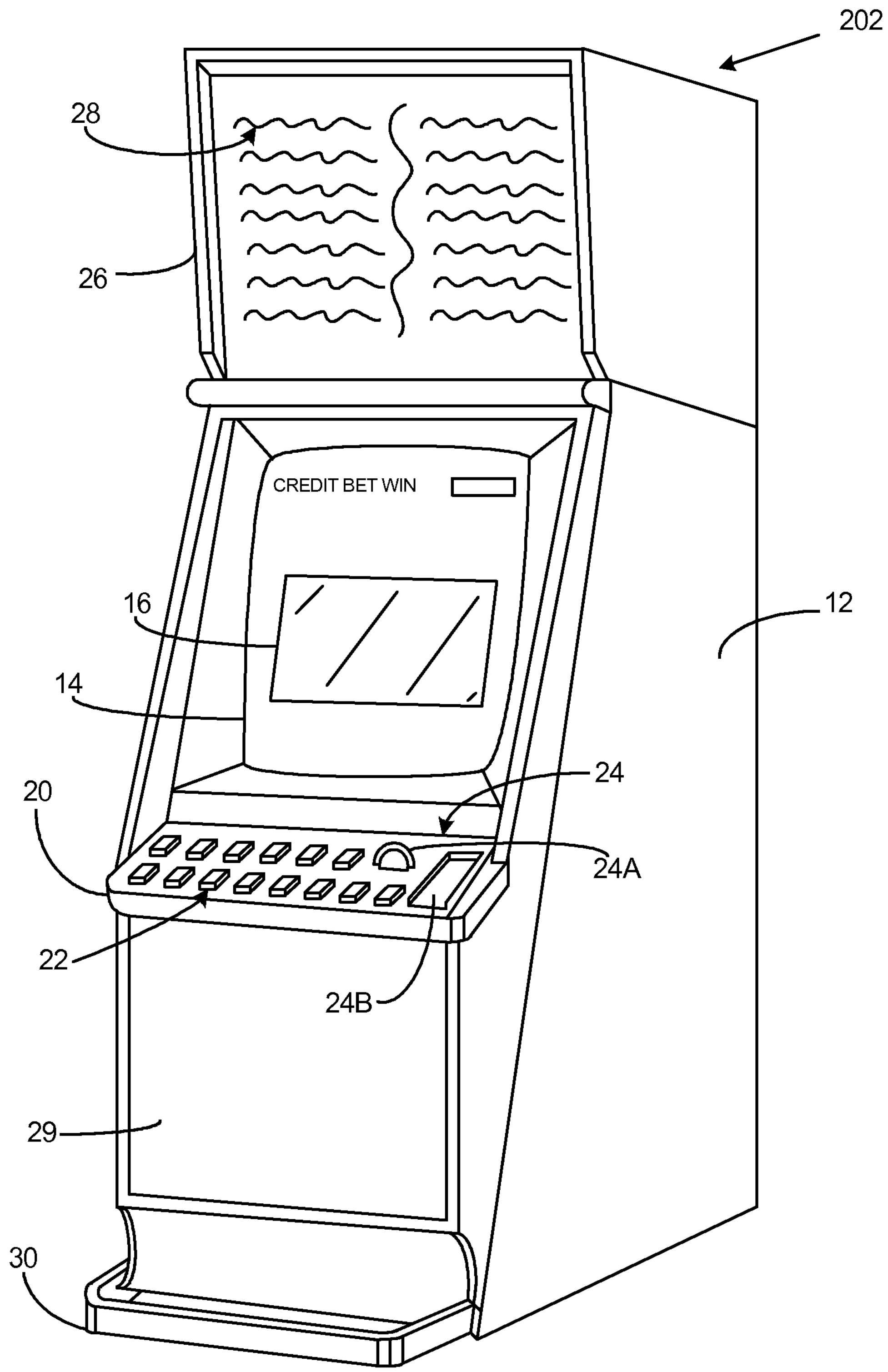
FIG. 2 is a perspective view of a stand alone gaming machine.

A gaming device in the form of a stand alone gaming machine 202 is illustrated in FIG. 2. The gaming machine 202 includes a console 12 having a display 14 on which are displayed representations of a game 16 that can be played by a player. A mid-trim 20 of the gaming machine 202 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 202.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
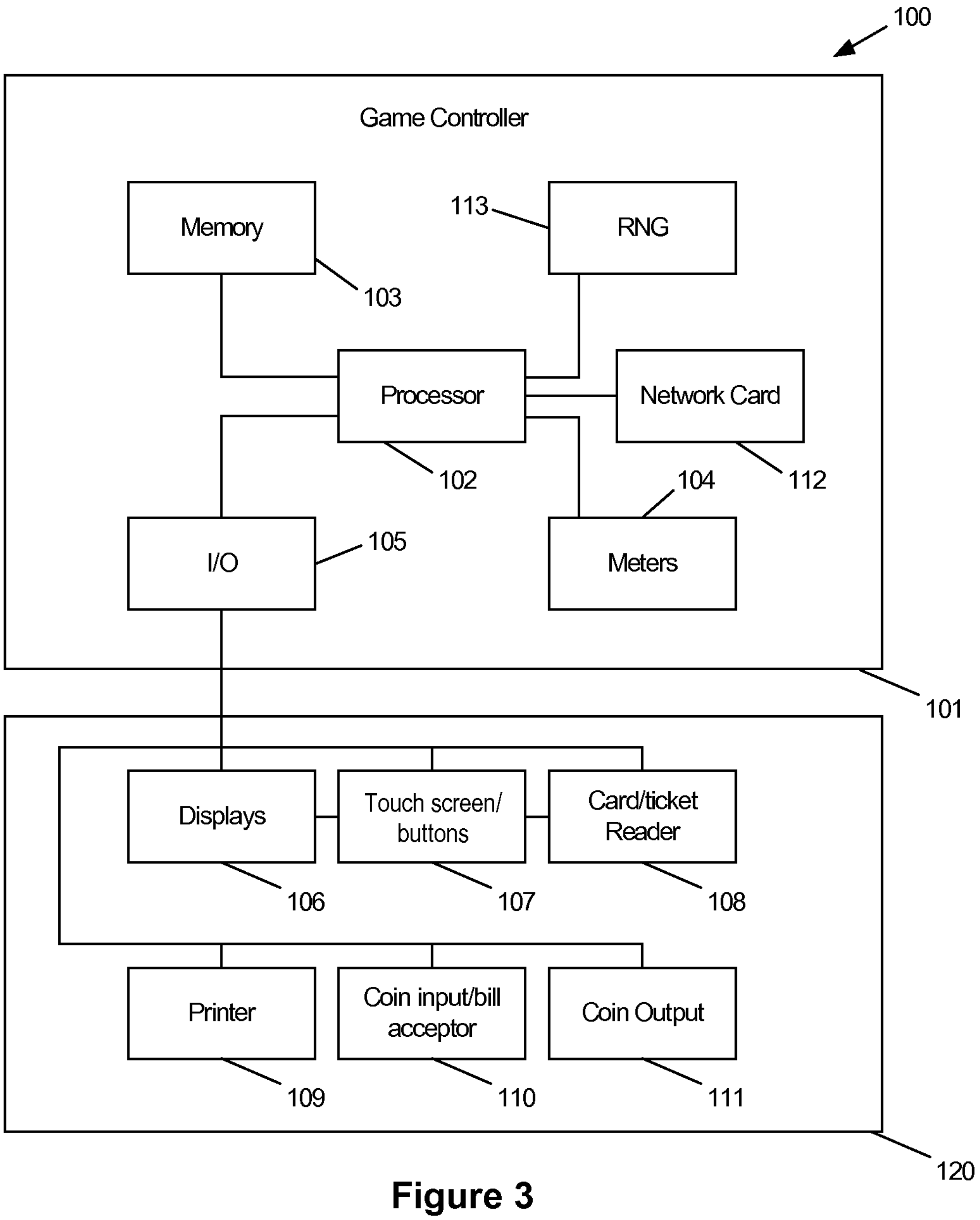
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107 (which provide a game play mechanism), speakers or audio output (not shown), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
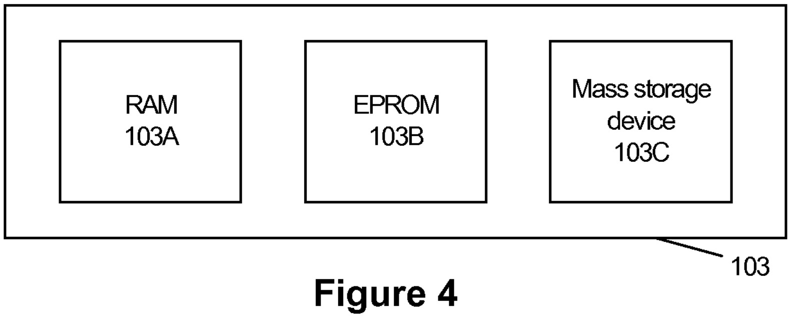
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 1038 or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 202 but the game server implements most or all of the game and as such acts as the game controller while the terminal operated by the player essentially provides only the player interface. The gaming terminal receives player instructions, pass these to the game server which will process them and return game play outcomes to the gaming machine for display.

Figure 5:
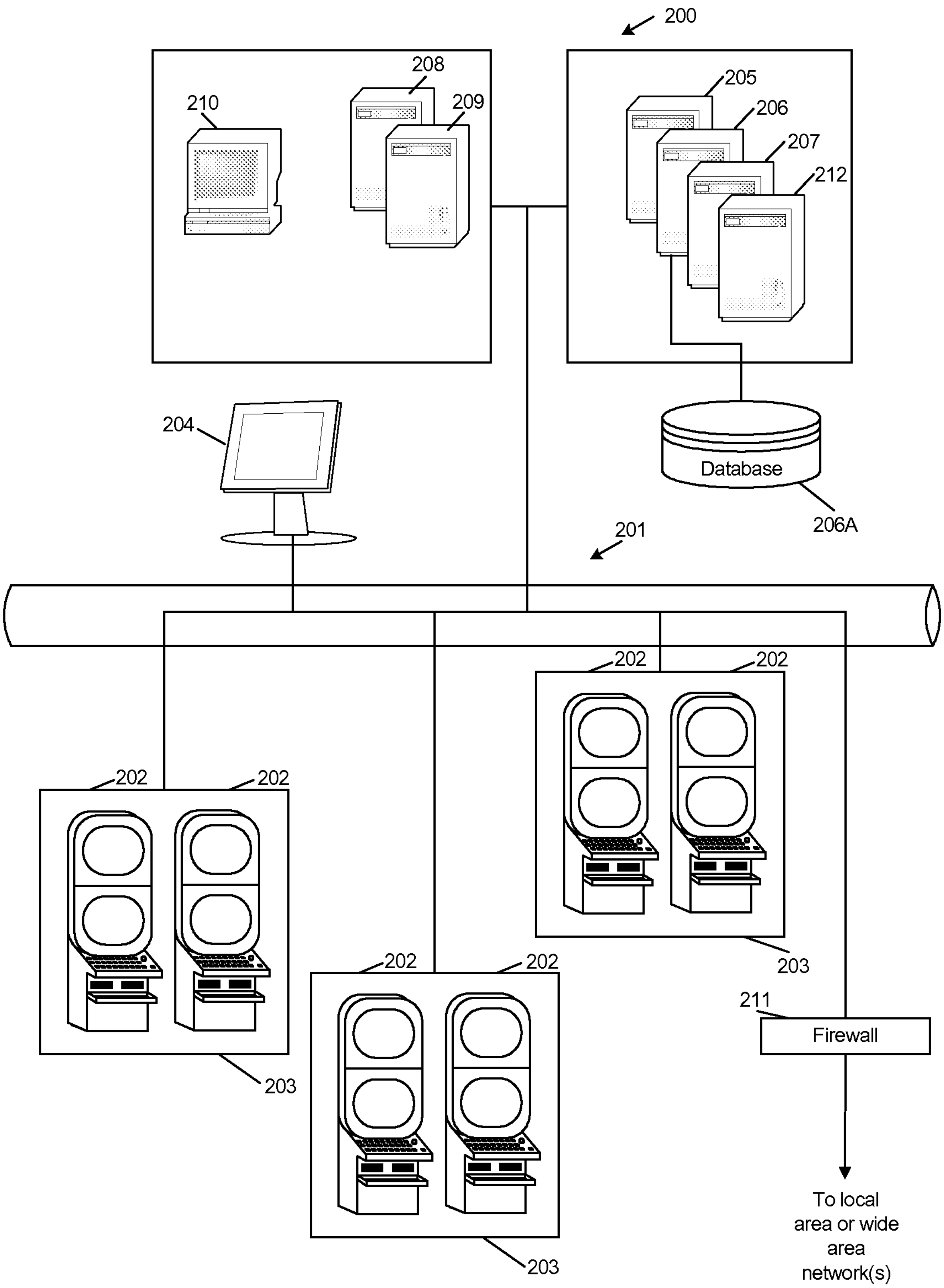
FIG. 5 is a schematic diagram of a network gaming system.

FIG. 5 shows that a gaming device may be connected within a gaming system 200 which provides additional and/or enhanced functionality. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 202, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

A gaming method and system wherein an event is triggered based on a game outcome of a game independent to that being played by a player of a gaming device is provided. The event is triggered using an outcome of an independent table game. The execution and result generation for the table game, for example a roulette game, is completely independent of the game being played using the gaming device. Results generated in the gaming device game do not influence the outcomes of the table game or any other play aspects, such as the pace of play and amounts bet for the table game. Players of the table game may be unaware that outcomes of their table game may be used to trigger events for gaming devices.

The event triggered for the gaming devices may be an event independent of regular game play, such as the awarding of a jackpot, bonus or progressive prize. Prizes awarded as a result of the triggered event may be allocated from award pools. The award pools may be common to a plurality of gaming devices or exclusive to a gaming device.

Embodiments can use any table game and be applied to gaming devices used for playing any type of game. The triggering outcome of the table game is completely independent of the game being played by the player using the gaming device. Thus the table game outcome occurs randomly relative to the gaming device game irrespective of whether or not the triggering outcome of the table game itself is a random result.

Figure 7:
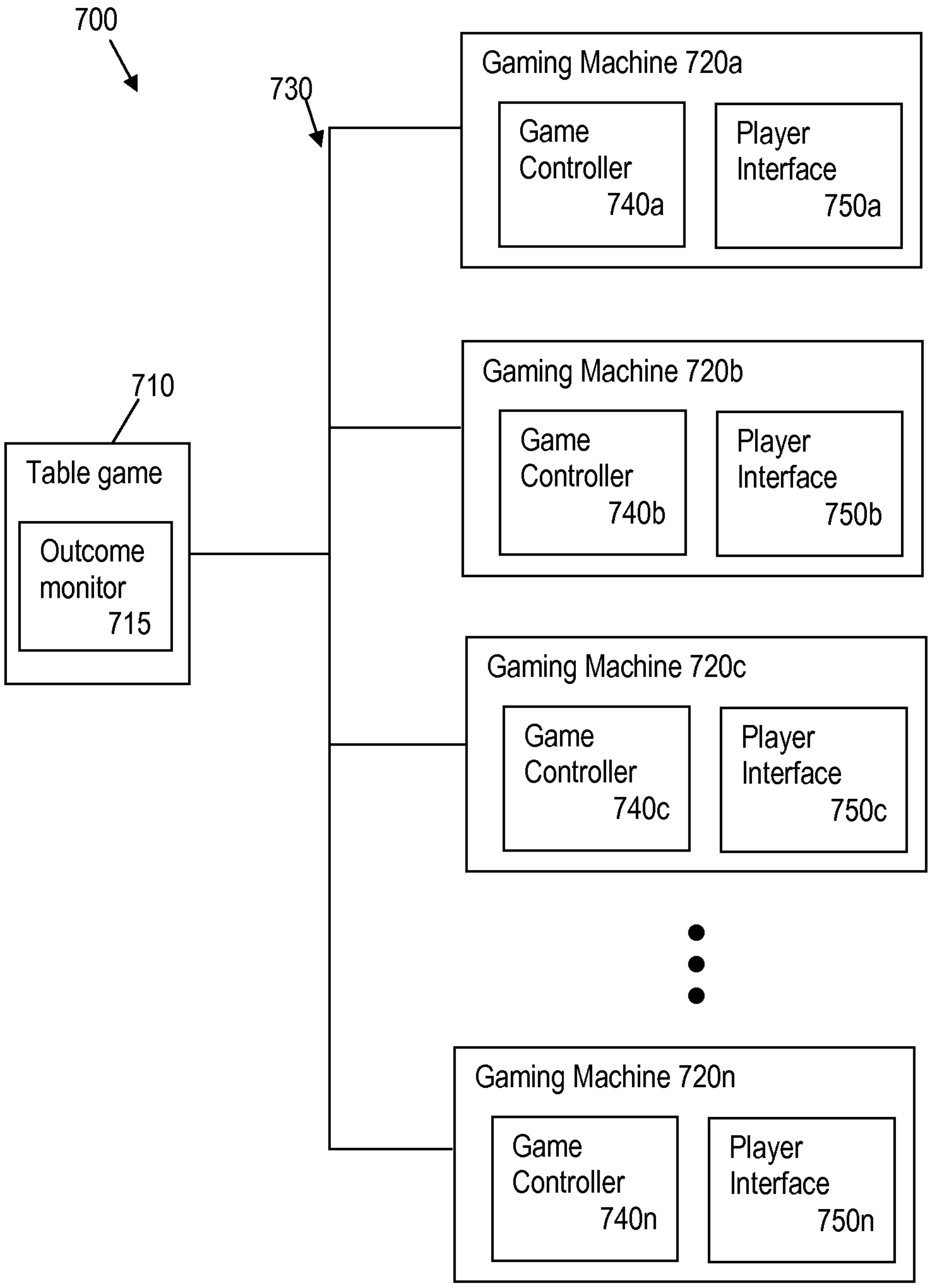
FIG. 7 is a further block diagram of a gaming system.

Embodiments may be applied for stand alone gaming machines, or networked client/server gaming devices having "thick client" or "thin client" architectures. FIG. 7 illustrates a system 700 comprising a table game 710 and stand alone gaming machines or "thick client" gaming devices 720*a-n*, wherein each gaming device includes all or substantially all the components required to implement game play. The gaming devices 720*a-n* receive game outcome data from the independent table game 710 via a network 730, for example via a gaming system monitoring network. Each gaming device 720*a-n* includes a game controller 740*a-n* and a player interface 750*a-n*. The game controller 740*a-n* of each gaming device 720*a-n* in this embodiment includes most or all the components required to implement a game in response to player instructions input via the player interface 750*a-n*. The game controller 740*a-n* of each gaming device can be further adapted to trigger an event in response to receiving a signal from the gaming table 710 indicating a given outcome of the table game has occurred.

Figure 8:
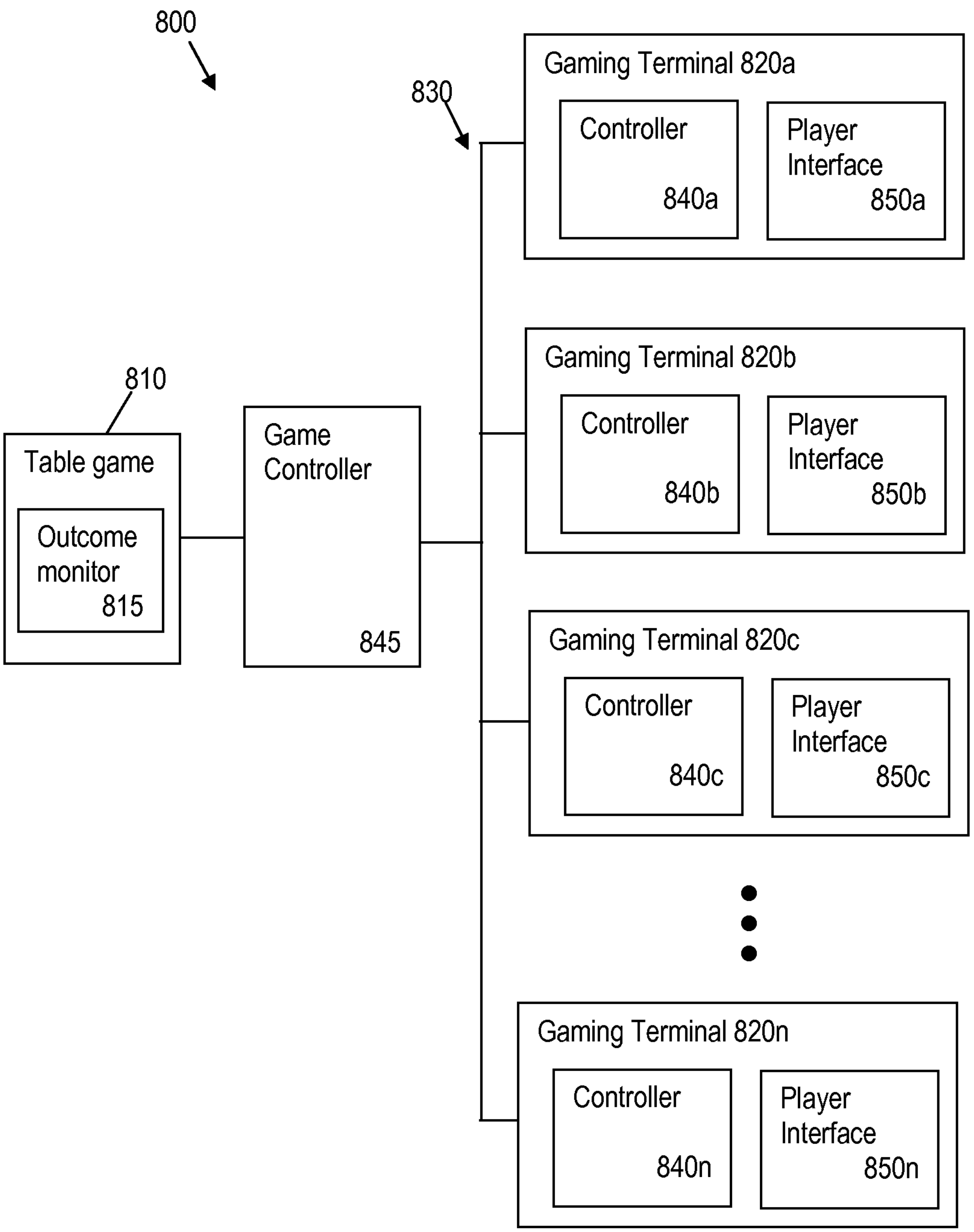
FIG. 8 is a further block diagram of a gaming system.

FIG. 8 illustrates a system 800 comprising a table game 810, game controller 845 and "thin client" gaming machines 820*a-n*. In this "thin client" embodiment the game controller 845 substantially controls game play for each of the gaming terminals 820*a-n*. The gaming terminals 820*a-n* each include a processor 840*a-n* and a player interface 850*a-n*. The processor 840*a-n* of each gaming terminal 820*a-n* in this embodiment includes a local client adapted to implement only some aspects of game execution.

The game controller 845 receives game outcome data from the independent table game 810 via a network 830, for example via a gaming system monitoring network, which may also be the network used for communication between the game controller 845 and the gaming terminals 820*a-n*. The game controller 845 triggers an event in response to receiving a signal from the gaming table 810 indicating a given outcome of the table game has occurred.

The gaming table 710, 810 may be provided with an outcome monitor 715, 815 and only send an event trigger signal when a given outcome occurs. For example, if the gaming table is a roulette table, the trigger outcome may be specified as the wheel spin landing on "0" or "00", alternatively the outcome may simply be the end of a wheel spin or based on an amount paid to players of the table. Any of these given outcomes occurring causes a signal to be generated at the gaming table 710, 810 and transmitted via the network 730, 830 for reception by the game controllers 740*a-n*, 845. The table game may be hard wired to send a signal for a given result, for example using a sensor in the "0" and "00" wheel positions. Alternatively outcome information for every outcome of the table game could be transmitted to the game controller which in turn monitors these outcomes to determine when the trigger condition has been met.

The game controllers 740*a-n*, 845 can be adapted to process the trigger outcome in accordance with game rule. For example, a trigger may be generated in response to the trigger outcome occurring in an independent table game and this trigger may be applicable for one or more gaming devices 720*a-n*, 820*a-n*. A trigger may be generated for every trigger outcome occurring in the independent table game or when a threshold number of trigger outcomes have occurred based on game rules. For example, where the trigger outcome is simply the beginning or end of a roulette wheel spin, the trigger condition for triggering the event may be five hundred wheel spins. It should be appreciated that the trigger conditions are defined in game rules and can vary from game to game. The trigger conditions may be variable under control of a casino operator. For example, a threshold number of outcomes may be variable or varied based on an associated prize. Alternatively the game rules may include trigger condition rules for more than one type of independent table game and the rules applied be altered in accordance with the table game type the gaming system is configured to receive the trigger outcome from.

Where a player is playing a gaming device an award may be made in accordance with the game rules for the trigger condition. However, it may be possible in some embodiment for a trigger outcome to occur while not all of the gaming devices 720*a-n*, 820*a-n* are being played. In such circumstances game rules may be applied for the handling of the trigger.

For example, in a first embodiment the application of the trigger may be delayed until a player beings play of the gaming device. In this case a trigger can be held for a game device, for example stored in memory, for application once a player being to play a game using the gaming device, for example when the next bet is placed. The application of the trigger condition may also be delayed until the player fulfils eligibility criteria, such as placement of an additional bet. In a second embodiment, if at the time a trigger occurs a gaming device is not currently being played, the trigger may simply be deleted. In a third embodiment, if at the time a trigger occurs a gaming device is not currently being played, any award playable for the trigger may be accumulated to be paid to the next player of the device in response to a further trigger. For example, the award which would normally be payable to a player can be accumulated in an award pool so this is paid out in addition to any award payable in response to a next trigger condition. Alternatively, the trigger could cause a "double" condition to be set, such that the next award made to a player in response to a trigger is doubled. It should be appreciated that these are examples of game rules which may apply for triggers generated for a gaming device in the absence of a player for the device and that further variations are envisaged. Enabling a trigger occurring for a gaming device in absence of a player to be applied for the next player of the gaming device can serve to increase player attraction and entertainment for the gaming devices.

In an alternative embodiment, instead of the table game sending a trigger to the gaming devices or game controller, the trigger may be sent to a jackpot controller which then implements a trigger event. For example, for a mystery link, an independent roulette table may send a signal to a jackpot controller every time an outcome of "0" or "00". The jackpot controller may record these trigger signals and once a defined number of trigger signals have been received, a message could be sent to a gaming device to pay an award.

The gaming devices 720*a-n*, 820*a-n* and the gaming tables 710, 810 are shown connected via a gaming network 730, 830. The gaming network may include more than one table game and in some embodiments it may be possible to configure the system to associate each gaming device selectively with a table game. This configuring may be performed by a gaming venue operator. Alternatively some configuring control may be given to the gaming device player. For example, a player may select whether to participate in an event triggered from a roulette table game or a card table game when they opt in to the triggered event. In response to the player's opt in instruction the gaming device will be associated, by the game controller, with the appropriate gaming table game.

Figure 6:
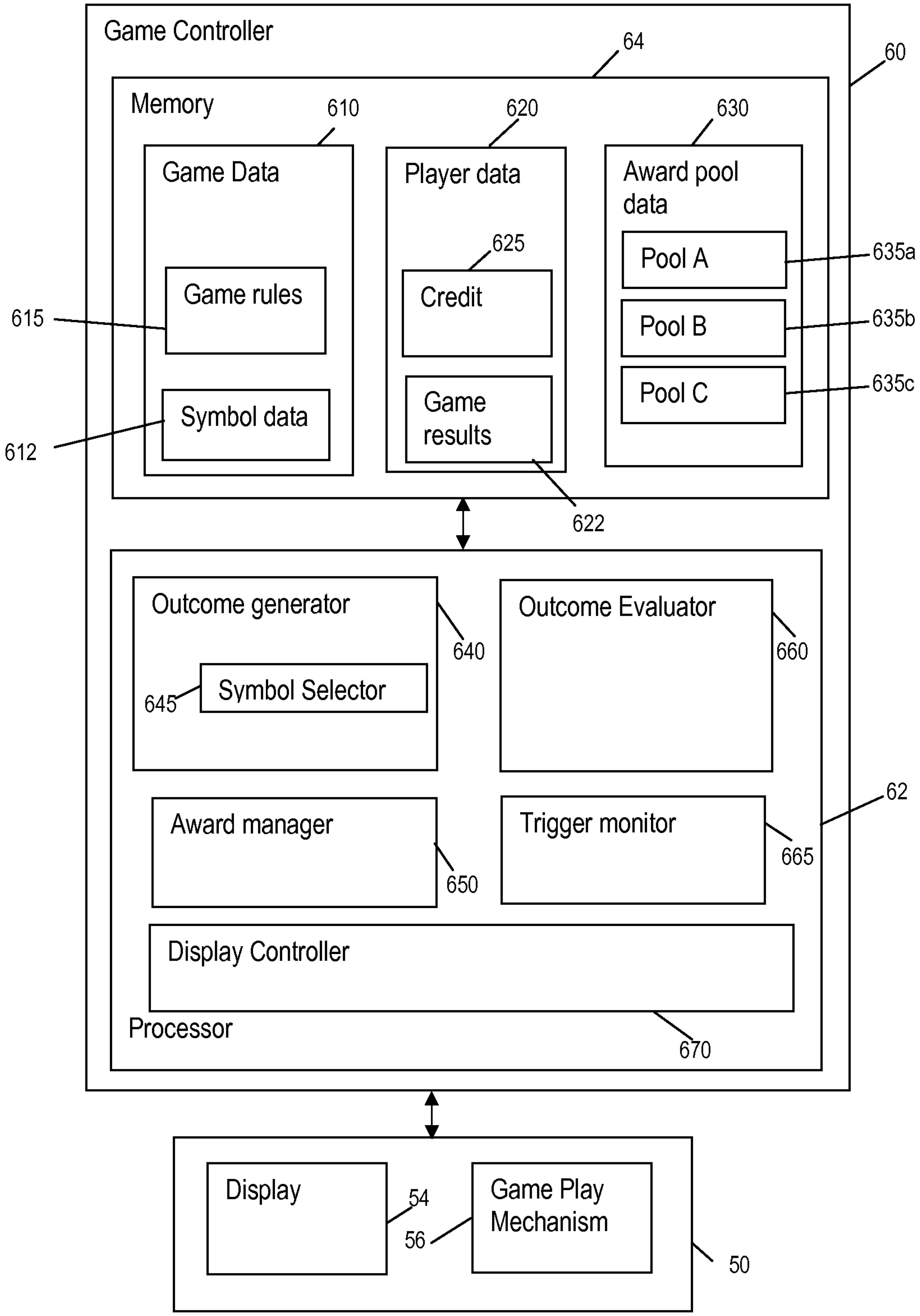
FIG. 6 is a further block diagram of a gaming system.

An example of a game controller for use in various embodiments is illustrated in FIG. 6. The game controller 60 has a processor 62 and memory 64. The controller may be connected to a player interface 50 directly, for example in a stand alone embodiment, or via a network. The game controller includes all the components required to implement a regular gaming device game. For example, the memory 64 stores game data 610 such as game rules 615 and symbol data 612 for one or more games played using the gaming device. The processor 62 uses the game data 610 for implementing the game, the processor can include software, firmware and/or hardcoded hardware functionality used for implementing game play such as an outcome generator 640 for generating outcomes for the game, which may include a symbol selector 645, an outcome evaluator 660 for evaluating game outcomes to determined whether winning criteria are met, and a display controller 670 for controlling the manner in which the game outcomes are displayed on the display 54 of the player interface 50. An award manager 650 adapted to determine and control the payout of awards for the game can also be included in the game controller.

In game controller embodiments adapted for triggering an event in response to an outcome of an independent table game, the game controller 60 includes a trigger monitor 665 adapted to receive trigger information from the independent table game. The trigger information may be a trigger signal, simply indicating the event is to be triggered. This trigger signal may be transmitted in response to a designated outcome occurring in the table game. Alternatively, the trigger information may be outcome data for the table game which is analysed by the trigger monitor 665 to determine whether the outcome which occurred is a designated outcome for triggering an event to occur on the gaming device.

Various events may be triggered in response to the designated table game outcome occurring. For example, the triggered event may be play of a feature game for which different awards are payable, a free play, an award etc.

In some embodiments, typically the award will be independent of the game being played using the gaming device. For example, the event may be an event which results in an award being allocated to one or more players of the gaming devices. The award may be made to all players or a selected number of players. For example, an award of a bonus prize may be made to the player who starts the first game after the trigger. Alternatively, a bonus may be awarded to a player as a result of a lottery drawn in response to the trigger. In other embodiments, awards may be made to players fulfilling given criteria, such as having exceeded a threshold bet amount.

The game controller can include an award manager 650 adapted to determine an award for one or more players of the gaming devices in response to the triggered event. The award manager can use award data 630 stored in memory 64 for determining the award for each player. The award data 630 can comprise one or more prize pools 635*a-c*, each prize pool may be associated with a given player or group of players. Alternatively each prize pool may be associated with a designated trigger condition. Any possible variation is contemplated within the scope of the present invention.

In a stand alone game machine embodiment, the award manager can be implemented as part of the game controller to determine whether or not to make the award for the player of the gaming machine. For example, a stand alone game machine may maintain a local award pool exclusive to the gaming machine and dedicated to the triggered event. Contributions to the triggered event award pool can be made using a portion of the credit wagered on the gaming machine. The portion of credit may be a portion of a regular bet to play the gaming machine game or contributed from an additional or ante bet payed to opt in to the triggered event. When the triggered event occurs an award can be determined for the player base on the size of the local award pool. The award may be the full amount of the local award pool or a portion of the local award pool dependent on the embodiment implemented. The portion of the award pool awarded to the player may be dependent on a player fulfilling eligibility criteria, such as a threshold cumulative bet amount. Alternatively the portion of the award pool awarded to the player may be dependent on another random process, such as a dice roll by the player. Such an embodiment has the advantage of providing additional entertainment for the player.

In an alternative embodiment, stand alone game machines may be linked via a network for the purpose of making an award based on the table game trigger. For example, a central award pool may be provided and the award manager of each gaming machine can be adapted to award a portion of the central pool in response to the trigger condition. For example, in an embodiment where a group of ten stand alone gaming machines are linked together to a table game, then a bonus can be awarded to each player of the gaming machines for the triggered event from the central award pool. In response to a designated table game outcome occurring, each player may be awarded one tenth of a bonus pool maintained for the group. The amount of the bonus pool may be based on the amount wagered from the group of ten gaming machines. Alternatively the bonus pool may be independent of the gaming machines, for example the bonus pool may be sponsored by the gaming venue or a third party and prizes awarded in the form of vouchers for goods and services or merchandise, credit prizes could also be provided.

In a thin or thick client embodiment a central award manager may be provided to determine awards for one or more players using a plurality of gaming devices. In this embodiment one or more central award pools can be maintained by the award manager. Each gaming device may contribute to the central award pools, for example by a portion of the amount bet being allocated to the award pool, or ante bets paid to opt in to the triggered event being allocated to the award pool. Alternatively or in addition to one or more central award pools, award pools exclusive to each gaming device may also be used. In such an embodiment a portion of an ante bet paid for a player to be eligible for the triggered event can be allocated to the central award pool and a portion to the local, gaming device exclusive, award pool. Awards can be made to the player form either the central or local award pool based on award rules defined for the embodiment implemented. For example, in one embodiment an award may be made form the local award pool in response to a first game outcome occurring in the table game and an award made from the central award pool in response to a second game outcome occurring in the table game. Alternatively awards for the triggered event may also be made from award pools associated with the regular game, for example where the event is an additional outcome or scatter pay for a regular game, then the awards may be made to each player in accordance with the regular game award rules from the regular game award pool.

In an alternative embodiment, in response to a triggered event, an award can be made to every eligible player from the respective local prize pools for the gaming devices and an award from the central award pool made to a selection of eligible players, for example in response to a random process occurring as part of the triggered event such as a dice roll or lottery.

In an alternative embodiment, eligibility criteria may be defined for the central award pool, for example a player's cumulative bet total must have achieved a threshold level to be eligible for an award form the central award pool. In this embodiment awards may be made from the local prize pool in response to the triggered event until the eligibility criteria is met.

The game controller triggers an event to occur on gaming devices in response to a designated trigger outcome occurring in the table game. The trigger event can be the award of a prize. Alternatively, the event may be an alternative award, for example the award may involve effects such as playing sounds and animations on each of the gaming devices, flashing lights etc or some other form of recognition. Further, an additional game could be played as part of the event, such as a lottery draw, dice roll, coin toss, fee game etc. The outcome of this additional game can be used to determine any award due to each player.

Figure 9:
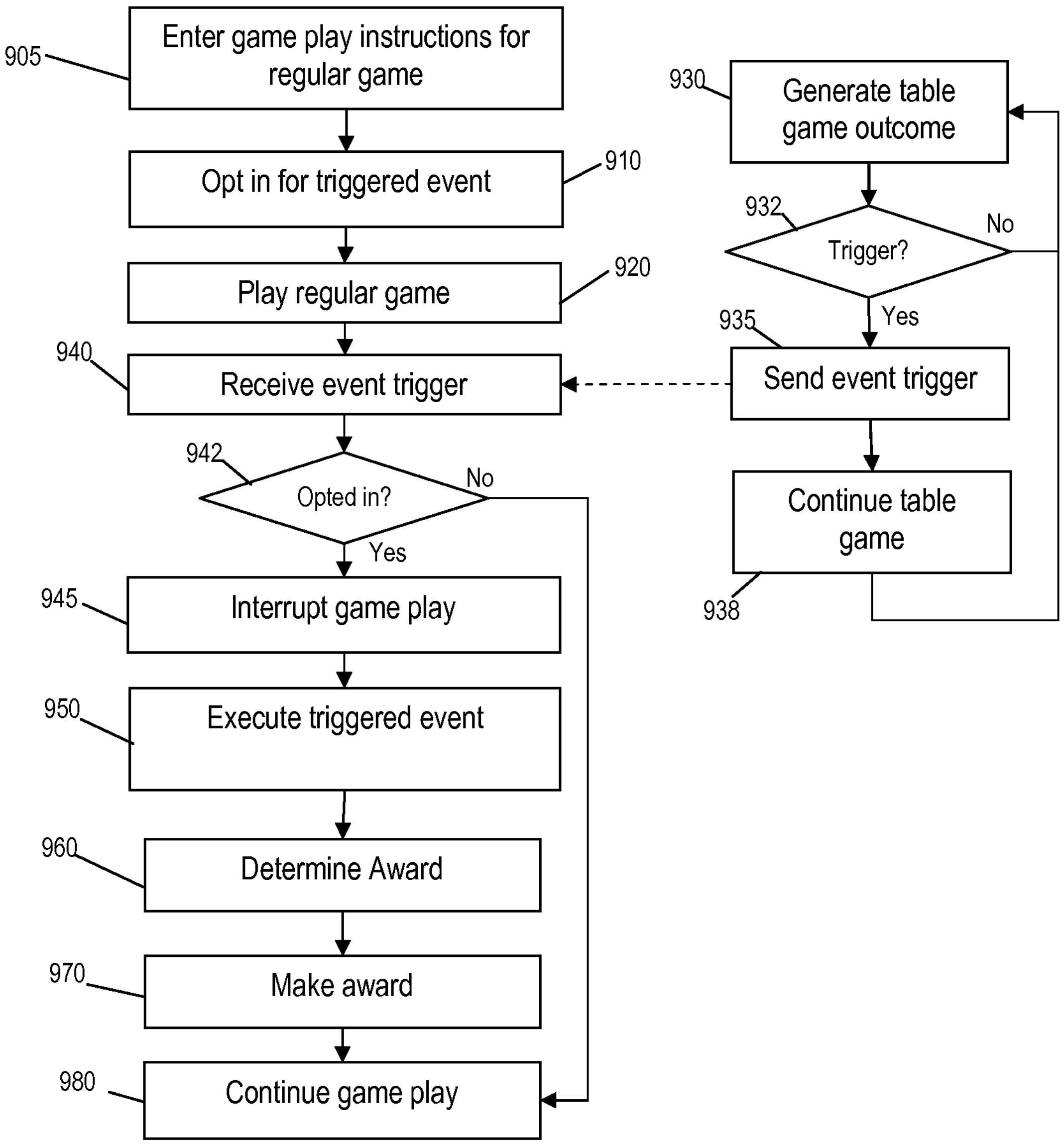
FIG. 9 is a flow chart of an embodiment.

An example of a game play process will now be described with reference to FIG. 9. The game play process starts with the player entering game play instructions using the player interface of the gaming device 905, this can include placing a wager to play a game. In this embodiment a player can choose whether or not to opt in 910 for the triggered event, this may include paying an ante bet. The regular game is played 920 in response to the player's instructions.

Independent of the regular game being played using the gaming device, outcomes are generated for a table game 930. If an occurring table game outcome is a designated trigger outcome 932, then a trigger signal is sent to the gaming devices 935. Once the trigger signal is sent the table game continues 938. The players of the table game may not be aware that a trigger signal has been sent. Further, sending the trigger signal can have no influence on play of the table game. For example, the table game may be a roulette game. A sensor or controller may be adapted to determine when the roulette wheel spin outcome is 0 or 00, such that when one of these outcomes occurs a trigger signal is sent to one or more game controllers for the gaming devices.

In response to receiving the trigger signal 940, the game controller can check whether the player as opted in or otherwise eligible for the triggered event 942. If the player is not eligible, then regular game play simply continues 980. Where the player is eligible for the trigger event 942, the regular game play may be interrupted 945 for the trigger event 950. As part of the trigger event prizes for one or more players can be determined 960 and awarded 970. An award manager can determine which players to make awards to based on award rules. Further the award pool chosen for making awards can also be determined based on award rules. For example, an award may be made to one player, such as a linked progressive prize awarded from an award pool which is funded from wagers placed through a group of participating gaming devices, or a local gaming device prize awarded from an award pool exclusive to one gaming device. Once an award for the event is made 970 play of the regular game continues 980.

It has been described in the example above that play of the regular game is interrupted by the triggered event. However, in alternative embodiments the event may be triggered in response to the outcome of the table game but the execution of the triggered event may be delayed until a given phase of game play, for example the event execution may be delayed until the completion of a game round or current game action, such as a reel spin, dice roll or card deal. As the occurrence of the trigger outcome in the table game is completely independent of the gaming device game, the trigger outcome may occur at any time during game execution. In some embodiments the trigger outcome may occur at a time when a player is ineligible for the event, depending on the phase of game play, for example before a player has opted in for the triggered event. Whether or not a trigger is stored to be applied at a later time, when the player is eligible for the event, is dependent on the game rules for the embodiment. In some embodiments, only trigger outcome occurring within an eligible window of game play may cause the event to be triggered.

It has been described above that a player can opt in for the triggered event. However, in some embodiments a player's entitlement for the triggered event may be determined automatically. For example, a group of gaming devices may be associated with the table game under the control of a gaming venue operator and any player of one of the gaming devices is automatically eligible for the triggered event. Alternatively, a player may become automatically eligible in response to fulfilling eligibility criteria, for example based on an amount wagered, cumulative win meter total, a game outcome occurring in a gaming machine game, or based on a player loyalty system such as a threshold number of loyalty points accumulated. In some embodiments a player may, instead of opting in for the triggered event, nominate to opt out of the triggered event if they are automatically determined eligible.

Although the above embodiments have been described in combination with a roulette table game and outcomes "0" and "00", alternative table games and outcomes may also be used. For example, the table game may be a card game and a trigger signal sent each time an outcome of four of a kind occurs, alternatively the table game may be a dice game and a trigger signal sent each time a double six is rolled. Any table game could be applied in embodiments of the present invention.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

It will be understood to persons skilled in the art of the invention that many modifications may be made without departing from the spirit and scope of the invention, in particular it will be apparent that certain features of the invention can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming for use with an independent table game and at least one gaming device, the method comprising:
- transmitting outcome information for each outcome of the independent table game to at least one gaming device;
- preselecting at least a part of the transmitted outcome information to define a variable trigger condition, said preselecting being performed under control of an operator of the independent table game;
- monitoring said outcome information to determine an occurrence of said trigger condition; and
- triggering an event to occur on the at least one gaming device in response to the occurrence of the variable trigger condition and, wherein said triggering includes (1) delaying occurrence of the event when the at last one gaming device is not being played, and (2) triggering the occurrence of the event once play of the at least one gaming device begins.

2. The method as claimed in claim 1 further including determining an award for a player of the at least one gaming device.

3. The method as claimed in claim 2 wherein determining an award includes allocating the award from an award pool associated with the at least one gaming device.

4. The method as claimed in claim 3 and further including dedicating the award pool for the triggered event.

5. The method as claimed in claim 4 wherein said dedicating includes dedicating the award pool to one gaming device.

6. The method as claimed in claim 3 and further including dedicating the award pool to one gaming device.

7. The method as claimed in claim 6 and further including dedicating the award pool to one gaming device.

8. The method as claimed in claim 1 further comprising an initial step of associating at least one gaming device with the independent table game for triggering the event in response to a table game outcome of the independent table game.

9. The method as claimed in claim 8 where associating the at least one gaming device with the independent table game includes controlling by a gaming venue administrator.

10. The method as claimed in claim 9 further including a player opting into the event triggering; and wherein the associating includes determining whether the player has opted into the event triggering.

11. The method as claimed in claim 10 wherein the player opting in includes paying of an additional bet by the player.

12. The method as claimed in claim 9 wherein associating in response to fulfilling the eligibility criteria includes achieving an outcome of a regular gaming device game.

13. The method as claimed in claim 9 wherein associating in response to fulfilling the eligibility criteria includes having received a threshold credit value for the gaming device.

14. A game controller for use with at least one gaming device and an independent table game, the game controller comprising a trigger monitor configured (1) to receive outcome information for each outcome of the independent table game, (2) to permit operator pre-selection of at least part of the outcome information to define a variable trigger condition, (3) in response to an occurrence of the variable trigger condition, triggering an event to occur on the at least one gaming device and (4) in response to the event being triggered when the at least one gaming device in not being played, delaying occurrence of the event and triggering the occurrence of the event once play of the at least one gaming device begins.

15. The game controller as clamed in claim 14, and further comprising an award manager configured to determine an award for a player of the at least one gaming device in response to the triggered event.

16. The game controller as claimed in claim 15 wherein the award is allocated from an award pool associated with the at least one gaming device.

17. The game controller as claimed in claim 16, and wherein the award is allocated from a plurality of prize pools.

18. The game controller as claimed in claim 17, and wherein the prize pools are exclusive to a gaming device for the award.

19. The game controller as claimed in claim 15, and wherein the award is allocated from an award pool dedicated for the triggered event.

20. The game controller as claimed in claim 19, and wherein the award pool is exclusive to the at least one gaming device.

21. The game controller as claimed in claim 14, and wherein the trigger monitor is further configured to associate the at least one gaming device with the independent table game for triggering the event in response to the table game outcome.

22. The game controller as claimed in claim 21, and wherein the trigger monitor is configured to be controlled by a gaming venue administrator for controlling the association of the at least one gaming device with the table game.

23. The game controller as claimed in claim 21, and wherein the trigger monitor is configured to associate the at least one gaming device with the table game in response to fulfilling eligibility criteria.

24. The game controller as claimed in claim 23, and wherein the eligibility criteria is based on a player opting in to the event triggering.

25. The game controller as claimed in claim 23, and wherein the eligibility criteria includes payment of an additional bet.

26. The game controller as claimed in claim 23 and for use with a regular gaming device game, and wherein the eligibility criteria is based on an outcome of the regular gaming device game.

27. The game controller as claimed in claim 23, and wherein the eligibility criteria is a based on a threshold credit value for the at least one gaming device.

28. A gaming system for use with at least one independent gaming device, the gaming system comprising:

a table game configured to generate game outcomes; and at least one game controller configured to control the at least one independent gaming device, the at least one game controller having a trigger monitor configured to receive outcome information for each outcome of the table game in response to an occurrence of a table game outcome, to permit operator pre-selection of at least part of the outcome information to define a variable trigger condition, and to trigger an event to occur on the at least one independent gaming device in response to the occurrence of the variable trigger condition, and wherein said game at least one game controller is configured to delay the event being triggered when the at least one independent gaming device is not being played, and to trigger the event once play of the at least one independent gaming device begins.

29. The gaming system as clamed in claim 28, and wherein the at least one game controller and the table game are in data communication via a gaming network.

30. The gaming system as claimed in claim 28, and further comprising an award manager configured to determine an award for a player of the at least one gaming device in response to the triggered event.

31. The gaming system as claimed in claim 30, and wherein the award is allocated from an award pool associated with the gaming devices.

32. The gaming system as claimed in claim 31, and wherein the award is allocated from a plurality of prize pools.

33. The gaming system as claimed in claim 32, and wherein the prize pools are exclusive to a gaming device for the award.

34. The gaming system as claimed in claim 30, and wherein the award is allocated from an award pool dedicated for the triggered event.

35. The gaming system as claimed in claim 34, and wherein the award pool is exclusive to the at least one gaming device.

36. The gaming system as claimed in claim 28, and wherein the trigger monitor is further configured to associate the at least one gaming device with the independent table game for triggering the event in response to the table game outcome.

37. The gaming system as claimed in claim 36, and wherein the trigger monitor is configured to be controlled by a gaming venue administrator for controlling the association of the at least one gaming device with the table game.

38. The gaming system as claimed in claim 36, and wherein the trigger monitor is configured to associate the at least one gaming device with the table game in response to fulfilling eligibility criteria.

39. The gaming system as claimed in claim 38, and wherein the eligibility criteria is based on a player opting in to the event triggering.

40. The gaming system as claimed in claim 38, and wherein the eligibility criteria includes payment of an additional bet.

41. The gaming system as claimed in claim 38 and for use with a regular gaming device game, and wherein the eligibility criteria is a based on an outcome of the regular gaming device game.

42. The gaming system as claimed in claim 38, and wherein the eligibility criteria is a based on a threshold credit value for the at least one gaming device.

* * * * *